United States Patent [19]

Hoff et al.

[11] 4,108,335

[45] Aug. 22, 1978

[54] APPARATUS FOR PROPORTIONING AND MIXING LIQUIDS

[76] Inventors: Carl Preston Hoff; Robert Arthur Martin, both of 731 21st St., Bakersfield, Calif. 93301

[21] Appl. No.: 720,775

[22] Filed: Sep. 7, 1976

[51] Int. Cl.[2] .......... B29B 5/06

[52] U.S. Cl. .......... 222/137; 222/334; 222/335

[58] Field of Search .......... 222/137, 335, 334

[56] References Cited

U.S. PATENT DOCUMENTS

| | | | |
|---|---|---|---|
| 2,501,004 | 3/1950 | Reese | 222/263 X |
| 2,946,488 | 7/1960 | Kraft | 222/137 X |
| 3,814,289 | 6/1974 | Robbins | 222/135 |

FOREIGN PATENT DOCUMENTS

| | | | |
|---|---|---|---|
| 1,454,898 | 2/1969 | Fed. Rep. of Germany | 222/137 |

*Primary Examiner*—Robert B. Reeves
*Assistant Examiner*—Frederick R. Handren
*Attorney, Agent, or Firm*—Huebner & Worrel

[57] ABSTRACT

An apparatus for proportioning and mixing liquids having a plurality of containers each containing a respective said liquid, a plurality of compression chambers individual to said containers connected in fluid communication with their respective containers, pistons individually mounted in the chambers for corresponding movement therein, a mixing head having an outlet and inlets individually connected to the chambers, and a system for sequentially pressurizing the containers to deliver their respective liquids to their respective chambers, and subsequently correspondingly pressurizing the pistons to deliver in proportioned amounts the liquids therein to their respective inlets of the mixing head.

3 Claims, 5 Drawing Figures

APPARATUS FOR PROPORTIONING AND MIXING LIQUIDS

BACKGROUND OF THE INVENTION

The present invention relates to an apparatus for proportioning and mixing liquids and more particularly to such an apparatus for mixing liquids which while isolated are inactive and remain unchanged for protracted periods of storage and/or transportation even if subjected to adverse environmental factors, such as temperature, physical disturbance and the like, but which when mixed promptly become active or display marked changes in character, frequently with sudden effect.

For example, epoxy resins have become important factors in the plastic industry. They are recognized to have excellent chemical resistance, adhesion to glass and metals, electrical insulating properties, ease and precision of fabrication, and because of their small density change when they polymerize are popular for potting or encapsulating delicate electrical components. Their dimensional stability and durability have made them popular for dies used even for stamping metals. With proper fillers, they have tensile strengths approaching, and strength to weight ratios, exceeding those of steel. The epoxy resins are generally recognized as a most versatile class of cross linked polyethers.

In the preparation of epoxy resins, a low molecular weight diepoxy compound is first mixed with a cross-linking agent, plasticizers and such fillers as are desired to achieve desired characteristics. They are then permitted to cure at room temperature or with the application of heat.

In the making of epoxy resin products, intermediate diepoxy compounds are formed as the reaction products of epichlorohydrin and aliphatic or aromatic diols. The intermediate diepoxy compounds are quite stable, can be prepared to achieve a wide range of desired balance of properties but do not have useful physical properties in themselves until they are polymerized further. Such polymerization may be initiated by any suitable catalyst such as boron trifluoride, tertiary amines, organic acids, alchohols, merchaptans, primary and secondary amines, and polyamines.

However, as useful as epoxy resins are known to be, their production is subject to well known difficulties for which the industry has long sought dependable solutions. In many instances the proportions of the constituents making up the intermediate diepoxy compounds and the proportions of the intermediate diepoxy compounds and their catalysts must be more accurately controlled than can be readily accomplished in a dependable manner by previously known equipment. It is the usual practice to supply the intermediate diepoxy compounds by means of a metering pump and to supply the catalysts by means of a further metering pump. In many instances, the operation of such pumps cannot be sufficiently precisely controlled and the resultant mixture of diepoxy compounds and catalysts vary in proportion and characteristics. Further, in such systems it is possible for one pump to deliver while the other pump does not deliver at all or delivers in a restricted manner. Further, if a pump or its associated conduits, becomes clogged, the other pump and its conduits continue to produce without restriction. Further, conventionally it is the usual practice to intermingle the constituents of epoxy resin prior to their entering a mixer of some type. Such systems are notoriously difficult to clean and frequently become so clogged as to preclude further utilization.

SUMMARY OF THE INVENTION

An object of the present invention is to provide an improved apparatus for proportioning and mixing a plurality of liquids.

Another object is to provide an apparatus for proportioning and mixing which when properly charged can deliver only in precisely predetermined proportions.

Another object is to obviate the use of pumps in liquid proportioning apparatus and the difficulties incident thereto.

Another object is to provide an apparatus for proportioning liquids in which, if properly charged, it is impossible to deliver the liquids other than in the predetermined proportion.

Another object is to eliminate the waste in epoxy resin mixing apparatus and the like incident to improper proportioning.

Another object is to minimize the clogging in apparatus for proportioning and mixing polyether resins and the like.

Further objects and advantages are to provide improved elements and arrangements thereof in a device of the character set forth which is economical, durable, and fully effective in accomplishing its intended purposes.

DESCRIPTION OF THE PREFERRED EMBODIMENT

Figure 1:
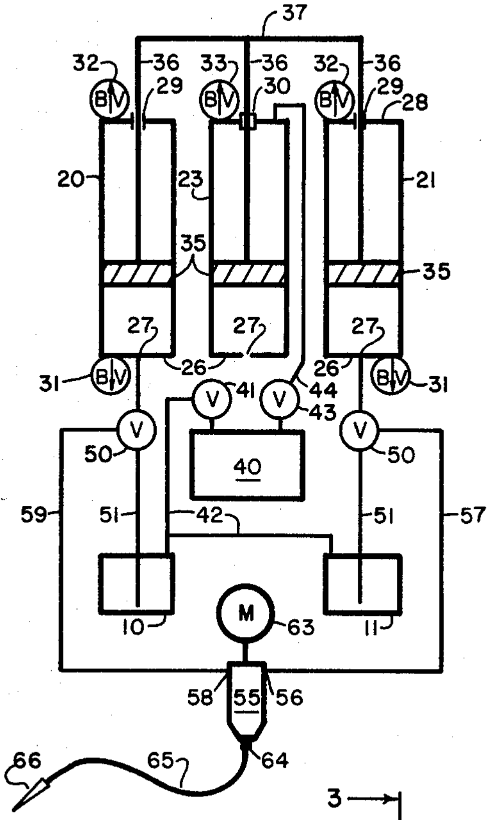
FIG. 1 is a schematic diagram illustrating a preferred embodiment of the present invention.

Referring in greater detail to the drawing and with specific reference to FIG. 1, substantially air tight containers are shown at 10 and 11. The container 10 may contain liquid intermediate diepoxy compound and the container 11 a catalyst therefore.

Obviously, any desired number of containers having respective liquids to be mixed can be utilized.

A pair of substantially cylindrical compression chambers are shown at 20 and 21. The compression chambers are individually paired with the containers 10 and 11. Thus, if more containers are required to contain and isolate more liquids, a corresponding number of compression chambers 20–21 are provided.

A substantially cylindrical drive chamber 23 is provided between the compression chambers 20 and 21. For purposes soon to become apparent, the chambers 20, 21 and 23 are preferably axially substantially parallel and transversely aligned.

Each of the chambers 20, 21 and 23 has a substantially closed lower end 26 providing a port 27 therein and a substantially closed upper end 28. The upper ends of the compression chambers 20 and 21 provide slide bearings 29 axially thereof and the drive chamber 23 provides an axially disposed packing gland 30. The lower ends 26 of the compression chambers are provided with manually operable bleed valves 31 and the upper ends thereof with similar manually operable bleed valves 32. The upper end of the drive chamber is provided with a manually operable bleed valve 33, all for reasons soon to be described.

Each of the chambers 20, 21 and 23 has a piston 35 mounted for reciprocal movement therein. Piston rods 36 are individually connected to the pistons and extended upwardly from their respective chambers. The piston rods 36 in the compression chambers 20 and 21 extend slidably through the slide bearings 29 and the piston rod 36 for the drive chamber 23 extends upwardly through the packing gland 30. Externally of the chambers, the upper ends of the rods 36 are rigidly interconnected by a bridge 37 for unitary reciprocal travel.

Referring further to FIG. 1, a source of air under pressure is indicated at 40. A valve 41 is connected to the source and to a conduit 42 which leads to both of the containers 10 and 11. Further, a valve 43 is connected to the source and to a conduit 44 which leads to the upper end of the drive chamber 23. The valves 41 and 43 are manually operable "on-off" valves.

Valves 50 are connected to the ports 27 of each of the compression chambers 20 and 21 and to respective conduits 51 which have lower ends individually disposed within the containers 10 and 11 and adjacent to the bottoms thereof.

A mixing head 55 has an inlet 56 connected by means of a conduit 57 to the valve 50 of the compression chamber 21 and an inlet 58 connected by means of a conduit 59 to the valve 50 of the compression chamber 20. The valves 50 are manually operable two way valves which in one position connect their respective ports 27 individually to the conduit 51 and in a second position connect their ports 27 to their respective conduits 57 and 59 connected to the inlets 56 or 58. As will subsequently become more clearly apparent, the mixing head 55 is driven by means of a gear head motor 63 and has an outlet 64 connected to a discharge hose 65 leading to a nozzle 66.

Figure 2:
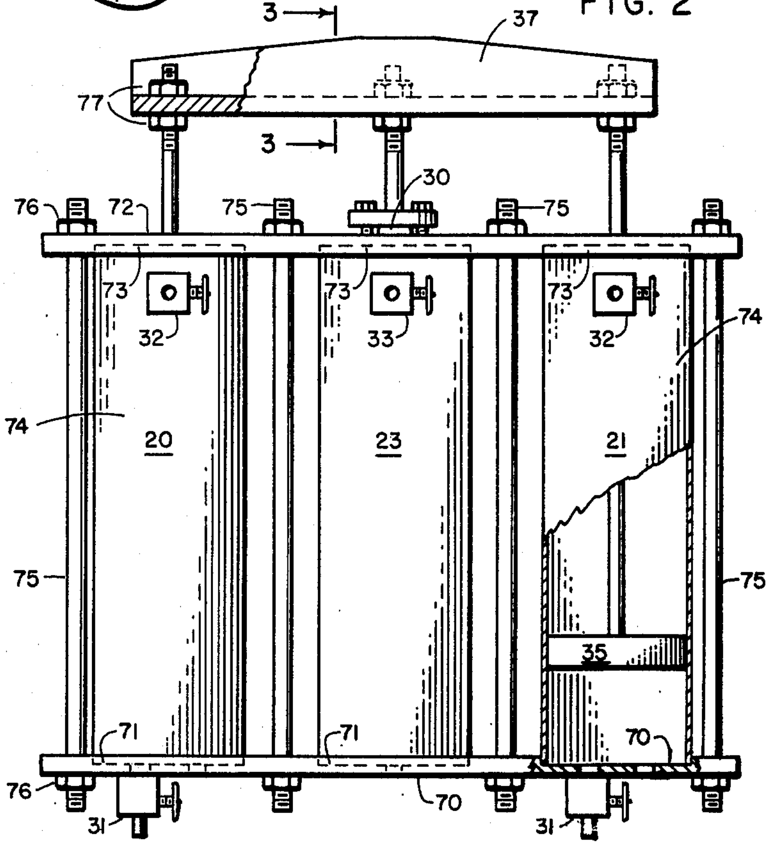
FIG. 2 is a side elevation, partially in vertical section of a measuring portion of the combined proportioning and mixing apparatus of the present invention.
Figure 3:
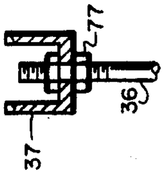
FIG. 3 is a section taken on line 3—3 of FIG. 2.
Figure 4:
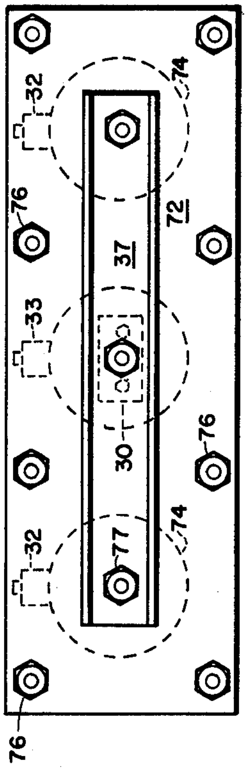
FIG. 4 is a plan view of the structure shown in FIG. 2.

The details of construction of the compression chambers 20 and 21 and drive chamber 23 are best shown in FIGS. 2 through 4. A bottom plate 70 provides three upwardly disposed sockets 71 and an upper plate 72 provides three downwardly disposed sockets 73. The plates are arranged in spaced facing relation with the sockets juxtaposed. Each of the chambers 20, 21 and 23 is formed by fitting sleeves 74 individual thereto into the juxtaposed sockets 71 and 73. Tension bolts 75 having nuts 76 screw threaded thereon are extended between the plates 70 and 72 and tightened to compress the plates in fluid tight engagement with their respective sleeves 74. Any desired gasketing, not shown, can be employed in the sockets.

The upper ends of the piston rods 36 are screw threaded, extended through respective bores in the bridge 37 and rigidly secured thereto by pairs of nuts 77. The bridge is conveniently formed by a channel member bored to receive the rods 36 therethrough.

Figure 5:
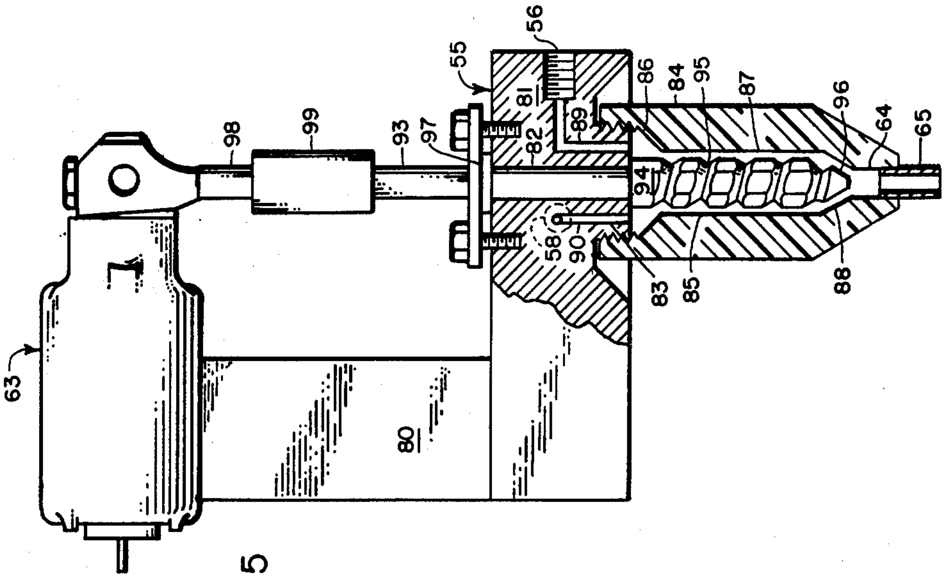
FIG. 5 is a side elevation of a mixing head and drive motor utilized in the proportioning mixing apparatus of the present invention with a portion of the head being shown in axial section.

As shown in FIG. 5, a bracket 80, of any suitable form, mounts the motor 63 and the mixing head 55. The mixing head provides a base 81 drilled to provide a journal 82 aligned with the motor and is provided with a male screw threaded nipple 83 concentric to the journal and extended oppositely from the motor. A shell 84 of teflon or the like is screw threaded onto the nipple 83. When the shell is in position, with the nipple it defines a chamber 85 having a funnel shaped upper portion 86, a cylindrical central portion 87 and a portion 88 constricted to the outlet 64. A bore 89 interconnects the chamber 85 and the inlet 56 and a bore 90 interconnects the chamber and the inlet 58.

A drive shaft 93 is rotatably mounted in the journal 82 and extended axially into the chamber 85. An agitator 94 is screw threadably mounted on the shaft 93 within the chamber. The agitator conveniently takes the form of a length of hexagonal bar stocks having a helical groove 95 cut therein with a tapered extended end 96 disposed at the constricted portion 88 of the chamber. A packing gland 97 is preferably provided about the drive shaft 93 to preclude leakage.

The motor 63 has a drive shaft 98 connected in aligned driving relation to the mixer shaft 93 by a coupling 99.

OPERATION

The operation of the apparatus for proportioning and mixing liquids is believed to be readily apparent and is briefly summarized at this point. Assuming that the compression chambers 20 and 21 are empty, the pistons 35 therein are rested on the lower ends 26 of such chambers. To initiate operation, the bleed valves 31 are closed and the bleed valves 32 and 33 opened. The valve 41 is opened to supply air under pressure through the conduit 42 to the containers 10 and 11. The valves 50 are adjusted to interconnect the conduits 51 with the ports 27 of their respective chambers 20 and 21 and to shut off the conduits 57 and 59. As the containers 10 and 11 are pressurized, intermediate diepoxy compound is forced through the conduit 51 and valve 50 into the chamber 20 beneath the piston 35 and at the same time catalyst is forced through the other conduit 51 and valve 50 into the chamber 21 beneath its piston. As the diepoxy compound and catalysts are received in their respective chambers, the pistons 35 thereof are forced upwardly to accommodate such liquids. During such movement, the port 27 in the driving chamber 23 admits air beneath its piston 35 and air above the pistons 35 in the compression chambers 20 and 21 and in the drive chamber 23 is bled to the atmosphere through the bleed valves 32 and 33. When the compression chambers 20 and 21 have been charged to the extent desired, the valve 41 is closed. The valves 50 are adjusted to interconnect the compression chambers 20 and 21 with their respective inlets 58 and 56 of the mixing head 55 through the conduits 59 and 57.

Bleed valve 33 is then closed while bleed valves 32 remain open and bleed valves 31 remain closed. Valve 43 is then opened to impose compressed air from the source 40 through the conduit 44 into the driving chamber 23 above the piston 35 to force the piston downwardly. The rigid interconnection of the piston rods 36 achieved by the bridge 37 causes all of the pistons 35 to descend as a unit. Such movement by the pistons 35 in the compression chambers 20 and 21 forces diepoxy compound from the chamber 20 to the valve 50 and conduit 59 to the inlet 58 while the piston 35 in the compression chamber 21 forces a corresponding amount of catalyst through the port 27, valve 50 and conduit 57 to the intake 56. In the illustrated embodiment of the present invention, equal parts of diepoxy compound and catalysts are delivered to the mixing head 55. In the instance of other liquids, other proportions may be desired. If so, the chambers 20 and 21 and their respective pistons 35 are proportioned to achieve the volumetric relationship needed to fit particular requirements.

With the motor 63 running, the agitator 94 is rotated. The diepoxy compound entering through the inlet 58 is thus rapidly mixed with the catalyst entering through the inlet 56. Under the pressure exerted by the compressed air released through valve 43 to the driving chamber 23, the mixed diepoxy compound and catalyst are forced out the outlet 64 and through the hose 65 for discharge out the nozzle 66. Because of the helical groove 95, the agitator 94 tends to urge the mixed liquids out the outlet 64 as the mixing progresses.

Since the diepoxy compound and catalyst are not mixed until they reach the chamber 85, there is no opportunity for them prematurely to interact. Thus, jamming or clogging prior to reaching the chamber 85 is virtually impossible. However, if anything does block movement of the pistons 35, they are all blocked and the described apparatus when properly loaded always feeds the liquids in precisely predetermined proportion or does not feed them at all.

Since the shell 84 is of teflon, even the mixed diepoxy compound and catalyst do not adhere thereto. When a given operation is completed, the shell 84 is unscrewed from the nipple 83 and rinsed clean in any suitable solvent. Similarly, the hose 65 and nozzle 66 can be rinsed clean. If it is desired to flush the entire system, containers not shown having suitable solvents therein are substituted for the containers 10 and 11 and the operational sequence repeated. If for any purpose it becomes desirable to empty the compression chambers other than in the manner described, the bleed valves 31 can be opened and the contents of their respective chambers drained therethrough.

It will be appreciated, that the apparatus of the present invention accurately proportions and mixes liquids and when the compression chambers 20 and 21 are properly charged, the apparatus can deliver only in the precisely predetermined proportions. The apparatus has obviated the use of pumps in liquid proportioning and mixing apparatus. Waste incident to improper proportioning has virtually been eliminated. Clogging has been eliminated except in instances of gross negligence. The apparatus is economical to produce and can be made available at a fraction of the cost of pump systems intended for the purpose.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. An apparatus for proportioning and mixing a plurality of liquids comprising:

(A) a plurality of closed containers each containing a respective said liquid;

(B) a plurality of cylindrical compression chambers individual to said containers having predetermined first and second ends;

(C) conduits interconnecting the containers with the first ends of their respective compression chambers;

(D) pistons mounted in the compression chambers for reciprocal movement in their respective chambers;

(E) means rigidly interconnecting the pistons for corresponding movement in their respective chambers;

(F) a pneumatic ram connected to the interconnecting means adapted when energized to force the pistons toward the first ends of their chambers;

(G) a mixing head having an outlet and inlets individual to the compression chambers;

(H) further conduits interconnecting the first ends of the compression chambers and their respective inlets in the mixing head;

(I) a source of air under pressure;

(J) still further conduits interconnecting the source of air and each of the containers as well as the ram; and (K) valves in said conduits operable to connect the source of air under pressure to the containers to force their contents into their respective chambers and the pistons therein toward the second ends thereof while retracting the ram, and subsequently to isolate the containers from said source and connect the source to the ram to extend the ram forcing the pistons toward the first ends of their chambers to force the contents of the chambers to the mixing head.

2. An apparatus for accurately proportioning and mixing a plurality of liquids comprising:

(A) substantially air tight containers individual to the liquids;

(B) substantially cylindrical compression chambers individual to the containers;

(C) a substantially cylindrical driving chamber;

(D) means interconnecting the compression chambers and the driving chamber in axially substantially parallel transverse alignment;

(E) pistons mounted in the chambers for reciprocal movement longitudinally thereof;

(F) means interconnecting the pistons in fixed relation for integral movement in their respective chambers;

(G) a mixing head having inlets individual to the compression chambers and an outlet for the mixed material;

(H) a source of air under pressure; and (I) means for alternately applying air under pressure from the source thereof to the containers and conducting materials therefrom to their respective compression chambers to move the pistons in a first direction and subsequently shutting off the containers from the source and applying air under pressure to the driving chamber to force the pistons in an opposite direction while conducting material forced from the compression chambers to the respective inlets of the mixing head.

3. An apparatus for proportioning and mixing a plurality of liquids comprising:

(A) a plurality of substantially airtight containers each containing a respective liquid;

(B) a plurality of substantially cylindrical compression chambers individual to the containers, each of the chambers having a port;

(C) a substantially cylindrical driving chamber;

(D) pistons in the compression chambers and the driving chamber;

(E) means mounting the compression chambers and driving chamber in axially substantially parallel transverse alignment;

(F) means rigidly interconnecting the pistons for corresponding movement in their respective chambers;

(G) conduit means individually interconnecting the containers and the ports of their respective compression chambers;

(H) a source of air under pressure;

(I) a mixing head having a plurality of inlets individual to the compression chambers and an outlet;

(J) conduit means interconnecting the inlets of the mixing head with the ports of their respective compression chambers;

(K) conduit means interconnecting the source of air under pressure and each of the containers as well as the driving chamber; and (L) valve means in the conduit means for opening the conduit means between the containers and their respective chambers, for opening the conduit means between the source of air under pressure and the containers, and for closing the conduit means to the driving chamber whereby liquids are forced from their respective containers into their respective compression chambers and for subsequently closing said conduit means between the containers and their chambers, for closing the conduit means between the source of air under pressure and the containers, for opening the conduit means between the chambers and the mixing head, and for opening the conduit means between the source of air under pressure and the driving chamber whereby the piston in the driving chamber forces the pistons in the compression chambers toward their ports to force liquids from said compression chambers in measured amounts into the mixing head.

* * * * *